(12) United States Patent
Wang et al.

(10) Patent No.: US 12,107,266 B2
(45) Date of Patent: Oct. 1, 2024

(54) COMPOSITE POSITIVE ELECTRODE MATERIAL AND PREPARATION METHOD THEREOF, SECONDARY BATTERY, BATTERY GROUP INCLUDING SECONDARY BATTERY, AND ELECTRIC APPARATUS INCLUDING SECONDARY BATTERY

(71) Applicant: CONTEMPORARY AMPEREX TECHNOLOGY CO., LIMITED, Ningde (CN)

(72) Inventors: Bangrun Wang, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 202 days.

(21) Appl. No.: 17/873,861

(22) Filed: Jul. 26, 2022

(65) Prior Publication Data
US 2022/0399540 A1    Dec. 15, 2022

Related U.S. Application Data

(63) Continuation of application No. PCT/CN2021/099876, filed on Jun. 11, 2021.

(51) Int. Cl.
*H01M 4/36* (2006.01)
*H01M 4/505* (2010.01)
(Continued)

(52) U.S. Cl.
CPC ......... *H01M 4/366* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| | | | |
|---|---|---|---|
| 2012/0263998 A1 | 10/2012 | Thackeray et al. | |
| 2020/0136170 A1 | 4/2020 | Shin et al. | |

FOREIGN PATENT DOCUMENTS

| | | | |
|---|---|---|---|
| CN | 106784632 A | 5/2017 | |
| CN | 109167050 A | 1/2019 | |

(Continued)

OTHER PUBLICATIONS

EPO Decision to grant a patent based on copending EP application No. 21916635.2 dated Feb. 8, 2024.
(Continued)

*Primary Examiner* — Carlos Barcena
(74) *Attorney, Agent, or Firm* — Ladas & Parry LLP (57) ABSTRACT

This application provides a composite positive electrode material and a preparation method thereof, a secondary battery, a battery group including the secondary battery, and an electric apparatus including the secondary battery. The composite positive electrode material includes a lithium-rich metal oxide and a positive electrode active material covering at least a partial surface of the lithium-rich metal oxide, where the positive electrode active material is formed through in-situ reaction between a positive electrode active material precursor and a free lithium compound on the surface of the lithium-rich metal oxide.

14 Claims, 4 Drawing Sheets

(51) Int. Cl.
  *H01M 4/525*      (2010.01)
  *H01M 4/58*       (2010.01)
  *H01M 10/0525*    (2010.01)
  *H01M 4/02*       (2006.01)

(52) U.S. Cl.
  CPC ..... *H01M 4/5825* (2013.01); *H01M 10/0525* (2013.01); *H01M 2004/021* (2013.01); *H01M 2004/028* (2013.01)

(56) References Cited

FOREIGN PATENT DOCUMENTS

| | | |
|---|---|---|
| CN | 109817926 A | 5/2019 |
| CN | 111834618 A | 10/2020 |
| CN | 112054166 A | 12/2020 |
| JP | 2010080231 A | 4/2010 |

OTHER PUBLICATIONS

1 Office Action for EP Application No. 21 916 635.2, dated Aug. 17, 2023, 5 pages.
International Search Report dated Feb. 25, 2022 for Application No. PCT/CN2021/099876.
GB/T 19077-2016/ISO 13320:2009, Particle size analysis-Laser diffraction methods.
Extended European Search Report for Application No. EP21916635, mailed on Mar. 13, 2023, 10 pages.
Hogg, Richard, "Issues in Particle Size Analysis," Kona Powder and Particle Journal, No. 26. Jan. 1, 2008.

COMPOSITE POSITIVE ELECTRODE MATERIAL AND PREPARATION METHOD THEREOF, SECONDARY BATTERY, BATTERY GROUP INCLUDING SECONDARY BATTERY, AND ELECTRIC APPARATUS INCLUDING SECONDARY BATTERY

CROSS-REFERENCE TO RELATED APPLICATIONS

This application is a continuation of PCT/CN2021/99876 filed on Jun. 11, 2021, which is incorporated herein by reference in its entirety.

TECHNICAL FIELD

This application relates to the field of energy storage technologies, and specifically, to a composite positive electrode material and a preparation method thereof, a secondary battery, a battery group including the secondary battery, and an electric apparatus including the secondary battery.

BACKGROUND

In recent years, with the application and popularization of secondary batteries in industries such as electronic products and new energy vehicles, the capacity and cycle life of secondary batteries attract increasing attention. However, in the first charge and discharge process of a secondary battery, a solid electrolyte interface (SEI) film is inevitably formed on a negative electrode, which consumes active ions. This causes irreversible capacity loss that is hard to eliminate, reduces an initial discharge capacity, and brings challenges to increase in the cycle life of the secondary battery.

SUMMARY

A first aspect of this application provides a preparation method of a composite positive electrode material, including the following steps:
  providing a kernel material, where the kernel material contains a lithium-rich metal oxide, and a surface of the lithium-rich metal oxide includes a free lithium compound;
  providing a positive electrode active material precursor;
  attaching the positive electrode active material precursor to at least a partial surface of the kernel material; and
  making the positive electrode active material precursor react with the free lithium compound so that a positive electrode active material is formed on at least a partial surface of the lithium-rich metal oxide, to obtain the composite positive electrode material.

In the preparation method of a composite positive electrode material according to this application, the positive electrode active material precursor generates the positive electrode active material in-situ on the surface of the lithium-rich metal oxide and consumes the free lithium compound on the surface of the lithium-rich metal oxide. This reduces a pH value, avoids slurry gelation caused by strong alkalinity of the lithium-rich metal oxide, and improves processing performance of a positive electrode slurry and a positive electrode membrane layer. A positive electrode active material coating layer of a housing is dense and uniform and is closely bonded to the lithium-rich metal oxide. This achieves a more effective coating and protection function for the lithium-rich metal oxide and improves stability of the lithium-rich metal oxide. The positive electrode active material coating layer is a good lithium-ion conductor and helps release lithium ions from the lithium-rich metal oxide in the kernel. Therefore, the lithium-rich metal oxide in the kernel can release more active lithium ions, which effectively makes up for the consumption of active lithium due to formation of an SEI film on a negative electrode. Excessive active lithium ions are intercalated into the negative electrode, making a negative electrode active material in a lithium-intercalated state. This alleviates a volume change of the negative electrode active material to some extent and further makes up for active lithium loss during battery cycling in the middle to late cycle. Therefore, with the composite positive electrode material obtained in the preparation method according to this application, an initial charge and discharge capacity can be increased, initial coulombic efficiency can be improved, and a cycle life of the battery can be increased.

In any embodiment of this application, the free lithium compound includes one or more of $Li_2O$, $LiOH$, and $Li_2CO_3$, and a mass percentage of the free lithium compound in the kernel material that is obtained through titration is 0.5 wt %-15 wt %, optionally 1 wt %-10 wt % and further optionally 3 wt %-7 wt %. The content of the free lithium compound in the kernel material is in a proper range, which can further increase the initial discharge capacity and cycle life of the secondary battery.

In any embodiment of this application, a mass ratio of the kernel material to the positive electrode active material precursor is 30:1-2:1, and optionally 25:1-10:1. The mass ratio of the kernel material to the positive electrode active material precursor is in a proper range, which can further increase the initial charge and discharge capacity and cycle life of the secondary battery.

In any embodiment of this application, a median particle size by volume $D_v50$ of the kernel material is 1 μm-10 μm, optionally 2 μm-8 μm and further optionally 3 μm-6 μm. The $D_v50$ of the kernel material is in a proper range, which can further increase the initial charge and discharge capacity and cycle life of the secondary battery.

In any embodiment of this application, a median particle size by volume $D_v50$ of the positive electrode active material precursor is 0.05 μm-3 μm, optionally 0.05 μm-1.5 μm and further optionally 0.1 μm-1.2 μm. The $D_v50$ of the positive electrode active material precursor is in a proper range, which can further increase the initial charge and discharge capacity and cycle life of the secondary battery.

In any embodiment of this application, a water content of the kernel material is ≤500 ppm, and optionally ≤200 ppm. A lower water content of the kernel material corresponds to a higher lithiation capacity. In addition, this helps generate a positive electrode active material of higher purity and form uniform coating for the lithium-rich metal oxide. Hence the secondary battery can obtain high overall performance.

In any embodiment of this application, the lithium-rich metal oxide is selected from one or more of $Li_2M^1O_2$, $Li_2M^2O_3$, $Li_3M^3O_4$, $Li_5M^4O_4$, and $Li_6M^5O_4$, where $M^1$ includes one or more of Ni, Co, Fe, Mn, Zn, Mg, Ca, and Cu; $M^2$ includes one or more of Mn, Sn, Mo, Ru, and Ir; $M^3$ includes one or more of V, Nb, Cr, and Mo; $M^4$ includes one or more of Fe, Cr, V, and Mo; $M^5$ includes one or more of Co, V, Cr, and Mo; and a valence state of each metal element other than Li in the lithium-rich metal oxide is lower than a highest oxidation valence state of the metal element.

In any embodiment of this application, the lithium-rich metal oxide is selected from one or more of $Li_2NiO_2$, $Li_2CuO_2$, $Li_2Ni_aCu_bM_{1-a-b}O_2$, $Li_2MnO_2$, $Li_3VO_4$, Li$_3$NbO$_4$, Li$_5$FeO$_4$, and Li$_6$CoO$_4$, and is optionally selected from one or more of Li$_2$NiO$_2$, Li$_2$CuO$_2$, Li$_2$Ni$_a$Cu$_b$M$_{1-a-b}$O$_2$, Li$_2$FeO$_4$, and Li$_6$CoO$_4$, where 0<a<1, 0<b<1, 0.9<a+b≤1, and M is selected from one or more of Zn, Sn, Mg, Fe, and Mn; optionally 0.4≤a≤0.8 and 0.2≤b≤0.6, and further optionally 0.5≤a≤0.7 and 0.3≤b≤0.5. These lithium-rich metal oxides have a high capacity, and therefore can further increase the initial charge and discharge capacity, initial coulombic efficiency, and cycle life of the battery.

In any embodiment of this application, the positive electrode active material precursor is selected from one or more of transition metal oxides, transition metal hydroxides, transition metal carbonates, and transition metal phosphates; optionally, the positive electrode active material precursor is selected from one or more of Ni$_{x1}$Co$_{y1}$Mn$_{z1}$(OH)$_2$, Ni$_{x2}$Co$_{y2}$Al$_{z2}$(OH)$_2$, Ni$_{x3}$CO$_{y3}$Mn$_{z3}$CO$_3$, Ni$_{x4}$CO$_{y4}$Al$_{z4}$CO$_3$, and MPO$_4$, and is further optionally selected from one or more of Ni$_{x1}$Co$_{y1}$Mn$_{z1}$(OH)$_2$, Ni$_{x2}$Co$_{y2}$Al$_{z2}$(OH)$_2$, and MPO$_4$, where x1+y1+z1=1, x2+y2+z2=1, x3+y3+z3=1, x4+y4+z4=1, and M is selected from one or more of Fe, Ni, Co, and Mn.

In any embodiment of this application, the positive electrode active material precursor is selected from one or more of transition metal oxides, transition metal hydroxides, and transition metal carbonates, and a median particle size by volume D$_v$50 of the positive electrode active material precursor is 0.5 μm-1.2 μm, and optionally 0.6 μm-1 μm.

In any embodiment of this application, the positive electrode active material precursor is selected from one or more of transition metal phosphates, and a median particle size by volume D$_v$50 of the positive electrode active material precursor is 0.1 μm-1 μm, and optionally 0.4 μm-0.6 μm.

In any embodiment of this application, the making the positive electrode active material precursor react with the free lithium compound includes: performing heat treatment at 600° C.-800° C. in a protective gas atmosphere for 2 hours to 8 hours.

A second aspect of this application provides a composite positive electrode material. The composite positive electrode material is prepared in the preparation method in the first aspect of this application. The composite positive electrode material contains a lithium-rich metal oxide and a positive electrode active material covering at least a partial surface of the lithium-rich metal oxide. The composite positive electrode material in this application can increase an initial charge and discharge capacity, initial coulombic efficiency, and a cycle life of a battery.

A third aspect of this application provides a secondary battery, including a positive electrode plate, where the positive electrode plate includes a positive electrode current collector and a positive electrode membrane layer disposed on the positive electrode current collector, the positive electrode membrane layer includes at least a first positive electrode material, and the first positive electrode material contains the composite positive electrode material in this application.

The secondary battery in this application uses the composite positive electrode material in this application and therefore has a high initial charge and discharge capacity, high initial coulombic efficiency, and a long cycle life.

In any embodiment of this application, the positive electrode membrane layer further includes a second positive electrode material, and the second positive electrode material includes one or more of a lithium transition metal oxide and a polyanion positive electrode material. In some embodiments, the lithium transition metal oxide is selected from one or more of lithium cobalt oxides, lithium nickel oxides, layered lithium manganese oxides, lithium nickel cobalt manganese oxides, lithium nickel cobalt aluminum oxides, spinel lithium manganese oxides, spinel lithium nickel manganese oxides, and modified materials thereof. In some embodiments, the polyanion positive electrode material may be selected from one or more of lithium iron phosphates, lithium manganese phosphates, lithium cobalt phosphates, lithium nickel phosphates, lithium manganese iron phosphates, and modified materials thereof. The positive electrode membrane layer further includes a second positive electrode material. This can increase a percentage of the positive electrode active material in the positive electrode plate and help the battery obtain a high energy density.

A fourth aspect of this application provides a battery group, including the secondary battery in this application.

A fifth aspect of this application provides an electric apparatus, including at least one of the secondary battery or the battery group in this application.

The battery group and the electric apparatus in this application include the secondary battery in this application, and therefore have at least technical effects that are the same as or similar to those of the secondary battery.

DESCRIPTION OF EMBODIMENTS

To make the objectives, technical solutions, and beneficial technical effects of this application clearer, the following describes this application in detail with reference to specific embodiments. It should be understood that the embodiments described in this specification are merely intended to interpret this application, but not intended to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the description of this specification, it should be noted that, unless otherwise stated, "more than" and "less than" a number means inclusion of the number itself, and "more types" in "one or more types" means two or more than two types.

In the description of this specification, unless otherwise stated, a term "or" indicates inclusion. In other words, a phrase "A or B" means "A, B, or both A and B". More specifically, all the following conditions fall within the condition "A or B": A is true (or present) but B is false (or not present); A is false (or not present) but B is true (or present); or both A and B are true (or present).

The foregoing invention content of this application is not intended to describe each of the disclosed embodiments or implementations of this application. The following description illustrates exemplary embodiments in detail by using examples. Throughout this application, guidance is provided by using a series of embodiments and the embodiments may be used in various combinations. In each embodiment, enumeration is only representative but should not be interpreted as exhaustive.

To meet a requirement of a secondary battery for high energy density, a lithiation technology may be used to increase an amount of active lithium ions and make up for active lithium loss of the secondary battery in a first charge and discharge process. In a theoretically feasible positive electrode lithiation technology, a lithium-rich metal oxide is introduced to a positive electrode to be used as a positive electrode lithiation material to prepare a lithium-rich positive electrode. In a battery formation or initial cycle process, the positive electrode lithiation material releases lithium to make up for irreversible active lithium loss caused due to formation of an SEI film on a negative electrode.

However, in an existing positive electrode lithiation material, an excessive amount of lithium sources are usually added in a formation process to increase a lithium content of the positive electrode lithiation material. The excessive lithium sources remain on a surface of the positive electrode lithiation material in a form of a free lithium compound such as $Li_2O$, $LiOH$, and $Li_2CO_3$. Presence of the free lithium compound may degrade stability of a lithium-rich material, reduce a lithiation effect, and may further decrease an energy density of the battery. In addition, the presence of the free lithium compound causes a pH value of the lithiation material to be generally high (pH>12). In a preparation process of a positive electrode slurry, the lithiation material with a high pH value may react with a binder (for example, polyvinylidene fluoride PVDF), causing the slurry to form a jelly-like gel. This not only makes processing of the positive electrode slurry and a positive electrode membrane layer difficult, but also affects capacity performance and a cycle life of the battery.

The inventors further found that a method of using carbon coating or an atomic layer deposited idle coating layer (for example, an $Al_2O_3$ layer) may achieve a function of isolating an external environment. However, a surface coating process is complicated. In particular, an electrochemical idle coating layer is not conducive to deintercalation of lithium ions from the internal lithiation material, and therefore provides limited help to the cycle life of the battery and may decrease the energy density of the battery.

Through in-depth research by the inventors, a solution in which an electrochemical active coating layer is used to improve stability and lithiation effect of a positive electrode lithiation material is provided. To improve the positive electrode lithiation material to a greater extent, the present invention provides a solution in which a surface of the positive electrode lithiation material is coated in-situ with a positive electrode active material layer. Based on this, an embodiment in a first aspect of this application provides a preparation method of a composite positive electrode material. The method includes the following steps (1) to (4).

(1) Provide a kernel material, where the kernel material contains a lithium-rich metal oxide, and a surface of the lithium-rich metal oxide includes a free lithium compound.
(2) Provide a positive electrode active material precursor.
(3) Attach the positive electrode active material precursor to at least a partial surface of the kernel material.
(4) Make the positive electrode active material precursor react with the free lithium compound so that a positive electrode active material is formed on at least a partial surface of the lithium-rich metal oxide, to obtain the composite positive electrode material.

The lithium-rich metal oxide may be used as a positive electrode lithiation material and disposed on a positive electrode. It can provide extra active lithium in a first or initial charge process of a battery. The lithium-rich metal oxide can be used to make up for irreversible active lithium loss caused due to formation of an SEI film on a negative electrode.

The lithium-rich metal oxide may be selected from lithium-rich metal oxides that are known in the art that can be used for positive electrode lithiation. In a formation process of the lithium-rich metal oxide, excessive lithium sources may be added. Residual lithium remains on a surface of the lithium-rich metal oxide in a form of a free lithium compound based on different degrees of reactions with $CO_2$, $H_2O$, and the like in an external environment. An example of the free lithium compound may include one or more of $Li_2O$, $LiOH$, and $Li_2CO_3$. In some embodiments, the free lithium compound outside the lithium-rich metal oxide is $LiOH$ and $Li_2CO_3$, and the free lithium compound inside the lithium-rich metal oxide is $Li_2O$.

A positive electrode active material is a material in a positive electrode plate (an electrode plate with a high potential in a battery) that participates in intercalation and deintercalation of active ions in a charge and discharge process of the battery.

In the preparation method of a composite positive electrode material according to this application, the free lithium compound on the surface of the lithium-rich metal oxide is handily used as a lithium source to react in-situ with the positive electrode active material precursor to generate the positive electrode active material and thus obtain the composite positive electrode material with the lithium-rich metal oxide coated in-situ with the positive electrode active material.

The lithium ions released from the lithium-rich metal oxide in the kernel in the first charge process may make up for the consumption of active lithium due to formation of the SEI film on the negative electrode, increasing an initial charge and discharge capacity, initial coulombic efficiency, and a cycle life of the battery. The positive electrode active material of a housing coats the surface of the lithium-rich metal oxide to isolate the external environment, which increases stability of the lithium-rich metal oxide during storage and use, and ensures purity and lithiation performance of the lithium-rich metal oxide. In addition, the positive electrode active material coating layer is a good lithium-ion conductor and helps improve lithiation efficiency. Further, using the positive electrode active material to coat the lithium-rich metal oxide may avoid additionally introducing inactive substance, thereby helping the battery obtain a high energy density.

Especially, compared to directly coating the surface of the kernel material with the positive electrode active material, the positive electrode active material precursor reacts in-situ on the surface of the kernel material to from a more dense and uniform positive electrode active material coating layer. In addition, the positive electrode active material coating layer generated in-situ is more tightly attached to the kernel. Therefore, stability of the composite positive electrode material is further increased and lithium-ion migration performance is further improved, which helps the battery obtain a high initial charge and discharge capacity and a long cycle life. The positive electrode active material coating layer is tightly attached to the kernel, so that a risk of peeling of the coating layer can be further reduced, thereby protecting the lithium-rich metal oxide during storage and use and better increasing the cycle life of the battery.

Especially, the in-situ generation of the positive electrode active material by the positive electrode active material precursor consumes the free lithium compound on the surface of the lithium-rich metal oxide, which reduces a pH value, thus avoids slurry gelation caused by strong alkalinity of the lithium-rich metal oxide, and improves processing performance of a positive electrode slurry and a positive electrode membrane layer.

In some embodiments, in step (1), a mass percentage of the free lithium compound in the kernel material is 0.5 wt %-15 wt %, optionally 1 wt %-10 wt % and further optionally 2 wt %-8 wt %, 3 wt %-7 wt %, or 4 wt %-6 wt %. The mass percentage of the free lithium compound in the kernel material is obtained through titration. A reagent solvent used in titration is, for example, a hydrochloric acid standard solution. An exemplary test method is as follows: Take 30 g of kernel material and stir the kernel material in 100 mL deionized water for 30 minutes at a rate of 200 rpm to obtain a to-be-tested sample. Titrate the free lithium compound in the to-be-tested sample with the hydrochloric acid standard solution and determine a titrating end point based on a jump caused by a potential change by using a composite pH electrode as an indicator electrode. Then calculate the mass percentage of the free lithium compound in the kernel material.

It may be understood that the kernel material is in contact with water. The free lithium compound $Li_2O$ easily reacts with water to form LiOH. Therefore, when titration is used to obtain the mass percentage of the free lithium compound in the kernel material, the free lithium compound $Li_2O$ therein is measured based on LiOH.

The kernel material contains a proper amount of free lithium compound. The positive electrode active material precursor may be used to fully consume the free lithium compound. This helps form a uniform positive electrode active material coating layer on the surface of the kernel. Therefore, stability of the lithium-rich metal oxide is further increased and alkalinity is decreased, so that the lithiation effect is better improved. In consequence, with the composite positive electrode material prepared by using the kernel material that contains a proper amount of free lithium compound, the initial charge and discharge capacity and cycle life of the battery may be further increased. If necessary, an amount of lithium source added during preparation of the lithium-rich metal oxide may be adjusted so that the amount of free lithium compound in the kernel material is in a required range.

In some embodiments, a water content of the kernel material is ≤500 ppm, and optionally ≤450 ppm, ≤300 ppm, ≤200 ppm, or ≤100 ppm. The free lithium compound in a surface layer of the kernel material easily absorbs water in the environment. A lower water content of the kernel material makes lower phase transition of the lithium-rich metal oxide in the kernel material, so that a high lithiation capacity is maintained. In addition, when the water content of the kernel material is low, reaction between the free lithium compound and the positive electrode material precursor may be improved. This helps generate a positive electrode active material of higher purity and form uniform coating for the lithium-rich metal oxide, thereby further increasing stability of the lithium-rich metal oxide and increasing the capacity of the composite positive electrode material. Hence the secondary battery can obtain high overall performance.

In this application, the water content of the kernel material has a common meaning known in the art and may be measured by using a common method known in the art. For example, it may be measured by using the following method: selecting a coulombic moisture meter with a model of 831; taking 10 g of kernel material and heating the kernel material at 170° C. in an automated Karl-Fischer heating sampler with a model of 874; and then using dry gas to blow the material at a rate of 40 mL/min into a titration cup for titration for 400 seconds.

In some embodiments, a median particle size by volume $D_v50$ of the kernel material is 1 μm-10 μm, and optionally 2 μm-8 μm, 2 μm-7 μm, 3 μm-6 μm, 4 μm-6 μm, or 4 μm-5 μm. A smaller particle size of the kernel material corresponds to a larger specific surface area, a higher activity, a larger contact area between the kernel material and the positive electrode active material precursor, and a fuller reaction between the free lithium compound and the positive electrode active material precursor. When the $D_v50$ of the kernel material is in a proper range, agglomeration in the kernel material may be reduced, coating of the lithium-rich metal oxide by the positive electrode active material may be more uniform, and the composite positive electrode material may have a high extractable capacity. Therefore, with the composite positive electrode material prepared by using the kernel material with a proper $D_v50$, the initial charge and discharge capacity and cycle life of the battery may be further improved.

In some embodiments, a median particle size by volume $D_v50$ of the positive electrode active material precursor is 0.05 μm-3 μm, and optionally 0.05 μm-2 μm, 0.05 μm-1.5 μm, 0.1 μm-1.5 μm, 0.1 μm-1.2 μm, 0.2 μm-1.2 μm, or 0.2 μm-1 μm. When the $D_v50$ of the positive electrode active material precursor is in a proper range, the contact area between the positive electrode active material precursor and the kernel material is large, and the positive electrode active material precursor is not prone to agglomeration. Therefore, a uniform positive electrode active material coating layer can be formed on the surface of the kernel by using the positive electrode active material precursor, stability and lithiation performance of the kernel lithiation material can be improved, and the initial charge and discharge capacity and cycle life of the battery can be increased.

In this application, the median particle sizes by volume $D_v50$ of the positive electrode active material precursor and the kernel material have a common meaning known in the art and may be measured by using a common method known in the art. For example, it may be measured by using a laser particle size analyzer (for example, Mastersizer 2000E made by Malvern Panalytical in the UK) in accordance with GB/T 19077-2016 Particle Size Analysis-Laser Diffraction Methods. $D_v50$ is a corresponding particle size when a cumulative volume percentage of the material reaches 50%.

In some embodiments, a capacity per gram of the kernel material is ≥300 mAh/g, and optionally ≥320 mAh/g, ≥350 mAh/g, ≥390 mAh/g, or ≥400 mAh/g. The capacity per gram of the kernel material is a ratio of an electric capacity that can be released by the kernel material to a mass of the kernel material. When the capacity per gram of the kernel material is high, the composite positive electrode material prepared from the kernel material can provide more active lithium for consumption during formation of the SEI film on the negative electrode, increase an amount of existing active lithium, and improve overall performance of the battery, for example, increasing the initial charge and discharge capacity, initial coulombic efficiency, and cycle life.

In some embodiments, the lithium-rich metal oxide may be selected from one or more of $Li_2M^1O_2$, $Li_2M^2O_3$, $Li_3M^3O_4$, $Li_5M^4O_4$, and $Li_6M^5O_4$, $M^1$, $M^2$, $M^3$, $M^4$, and $M^5$ each represent a metal element. A valence state of each metal element other than Li in the lithium-rich metal oxide is lower than a highest oxidation valence state of the metal element.

In $Li_2M^1O_2$, $M^1$ may include one or more of Ni, Co, Fe, Mn, Zn, Mg, Ca, and Cu. Optionally, $M^1$ includes one or more of Ni, Co, Mn, and Cu. Optionally, $M^1$ includes one or more of Ni, Co, Mn, and Cu. In an example, $Li_2M_1O_2$ may include one or more of $Li_2NiO_2$, $Li_2MnO_2$, $Li_2CuO_2$, $Li_2Ni_aCu_bM_{1-a-b}O_2$, and $Li_2Co_dMn_{1-d}O_2$. Optionally, $Li_2M^1O_2$ includes one or more of $Li_2NiO_2$, $Li_2CuO_2$, and $Li_2Ni_aCu_bM_{1-a-b}O_2$. Optionally, $Li_2M^1O_2$ includes $Li_2Ni_aCu_bM_{1-a-b}O_2$. In these cases, 0<a<1, 0<b<1, 0.9<a+b≤1, and M is selected from one or more of Zn, Sn, Mg, Fe, and Mn. Optionally, 0.1≤a≤0.9, 0.2≤a≤0.8, 0.4≤a≤0.8, 0.4≤a≤0.6, or 0.5≤a≤0.7. Optionally, 0.1≤b≤0.9, 0.2≤b≤0.8, 0.2≤b≤0.6, 0.2≤b≤0.5, or 0.3≤b≤0.5. In these cases, 0<d<1. Optionally, 0.5≤d≤0.8.

In $Li_2M^2O_3$, $M^2$ may include one or more of Mn, Sn, Mo, Ru, and Ir. Optionally, $M^2$ includes one or more of Mn, Mo, and Sn. In an example, $Li_2M^2O_3$ may include one or more of $Li_2MnO_3$ and $Li_2MoO_3$.

In $Li_3M^3O_4$, $M^3$ may include one or more of V, Nb, Cr, and Mo. Optionally, $M^3$ includes one or more of V, Nb, and Mo. In an example, $Li_3M^3O_4$ may include one or more of $Li_3VO_4$, $Li_3NbO_4$, and $Li_3MoO_4$. Optionally, $Li_3M^3O_4$ includes one or more of $Li_3VO_4$ and $Li_3NbO_4$.

In $Li_5M^4O_4$, $M^4$ may include one or more of Fe, Cr, V, and Mo. Optionally, $M^4$ includes one or more of Fe, Cr, and V. In an example, $Li_5M^4O_4$ may include one or more of $Li_5FeO_4$, $Li_5CrO_4$, and $Li_5VO_4$. Optionally, $Li_5M^4O_4$ includes $Li_5FeO_4$.

In $Li_6M^5O_4$, $M^5$ may include one or more of Co, V, Cr, and Mo. Optionally, $M^5$ includes one or more of Co, V, and Cr. In an example, $Li_6M^5O_4$ may include one or more of $Li_6CoO_4$, $Li_6VO_4$, and $Li_6CrO_4$. Optionally, $Li_6M^5O_4$ includes $Li_6CoO_4$.

In some embodiments, the lithium-rich metal oxide may include one or more of $Li_2M^1O_2$, $Li_2M^2O_3$, $Li_5M^4O_4$, and $Li_6M^5O_4$. Optionally, the lithium-rich metal oxide may include one or more of $Li_2M^1O_2$, $Li_5M^4O_4$, and $Li_6M^5O_4$. In these cases, $M^1$, $M^2$, $M^4$, and $M^5$ each have a meaning defined herein.

The lithium-rich metal oxide has a proper chemical composition and can have a high capacity per gram and good stability.

In some embodiments, the lithium-rich metal oxide may include one or more of $Li_2NiO_2$, $Li_2CuO_2$, $Li_2Ni_aCu_bM_{1-a-b}O_2$, $Li_2MnO_2$, $Li_3VO_4$, $Li_3NbO_4$, $Li_5FeO_4$, and $Li_6CoO_4$. Optionally, the lithium-rich metal oxide includes one or more of $Li_2NiO_2$, $Li_2CuO_2$, $Li_2Ni_aCu_bM_{1-a-b}O_2$, $Li_5FeO_4$, and $Li_6CoO_4$. In some embodiments, the lithium-rich metal oxide includes one or more of $Li_5FeO_4$ and $Li_6CoO_4$. In these cases, a, b, and M each have a meaning defined herein.

In step (2), a substance known in the art that can react with the free lithium compound to form a positive electrode active material may be used as the positive electrode active material precursor. In some embodiments, the positive electrode active material precursor may be selected from one or more of transition metal oxides, transition metal hydroxides, transition metal carbonates, and transition metal phosphates. In some embodiments, the positive electrode active material precursor may be selected from one or more of transition metal hydroxides, transition metal carbonates, and transition metal phosphates. In the positive electrode active material precursor, a transition metal may include, for example, one or more of Mn, Fe, Ni, Co, Cr, Ti, Zn, V, Zr, and Ce. In some embodiments, the positive electrode active material precursor may further include a metal element other than the transition metal, for example, may include one or more of Al, Mg, Ca, Ge, and Sn.

Persons skilled in the art easily understand that a positive electrode active material formed by a transition metal oxide, a transition metal hydroxide, or a transition metal carbonate is a corresponding lithium transition metal oxide, and a positive electrode active material formed by a transition metal phosphate is a corresponding lithium transition metal phosphate.

In some embodiments, the positive electrode active material precursor may be selected from transition metal hydroxides. The transition metal hydroxide may include, for example, one or more of $Ni_{x1}Co_{y1}Mn_{z1}(OH)_2$ and $Ni_{x2}Co_{y2}Al_{z2}(OH)_2$. Correspondingly, a positive electrode active material formed therefrom may include one or more of $Li_{s1}Ni_{x1}Co_{y1}Mn_{z1}O_2$ and $Li_{s2}Ni_{x2}Co_{y2}Al_{z2}O_2$. x1+y1+z1=1, to be specific, 0≤x1≤1, 0≤y1≤1, 0≤z1≤1, and x1+y1+z1=1. Optionally, 0<x1<1, 0<y1<1, and 0<z1<1. Further optionally, 0.3≤x1≤0.95, 0.5≤x1≤0.9, or 0.6≤x1≤0.8. 0.7≤s1≤1.2. Optionally, 0.8≤s1≤1.2, 0.9≤s1≤1.15, 1.0≤s1≤1.2, or 1.0≤s1≤1.1. x2+y2+z2=1, to be specific, 0≤x2≤1, 0≤y2≤1, 0≤z2<1, and x2+y2+z2=1. Optionally, 0<x2<1, 0<y2<1, and 0<z2<1. Further optionally, 0.3≤x2≤0.95, 0.5≤x2≤0.9, or 0.6≤x2≤0.85. 0.7≤s2≤1.2. Optionally, 0.8≤s2≤1.2, 0.9≤s2≤1.15, 1.0≤s2≤1.2, or 1.0≤s2≤1.1.

In an example, the transition metal hydroxide may be selected from one or more of nickel hydroxide $Ni(OH)_2$, cobalt hydroxide $Co(OH)_2$, manganese hydroxide $Mn(OH)_2$, nickel cobalt composite hydroxide $Ni_{x1}Co_{y1}(OH)_2$ (0<x1<1, 0<y1<1, and x1+y1=1), nickel cobalt manganese composite hydroxide $Ni_{x1}Co_{y1}Mn_{z1}(OH)_2$ (0<x1<1, 0<y1<1, 0<z1<1, and x1+y1+z1=1), and nickel cobalt aluminum composite hydroxide $Ni_{x2}Co_{y2}Al_{z2}(OH)_2$ (0<x2<1, 0<y2<1, 0<z2<1, and x2+y2+z2=1). In some embodiments, the transition metal hydroxide is selected from one or more of nickel cobalt manganese composite hydroxide $Ni_{x1}Co_{y1}Mn_{z1}(OH)_2$ and nickel cobalt aluminum composite hydroxide $Ni_{x2}Co_{y2}Al_{z2}(OH)_2$. A positive electrode active material generated through reaction between a proper transition metal hydroxide and the free lithium compound requires a low sintering temperature, which may shorten a sintering duration, especially may reduce volatilization of the free lithium compound during sintering, and help improve purity of the positive electrode active material layer.

In some embodiments, the positive electrode active material precursor may be selected from transition metal carbonates. The transition metal carbonate may include, for example, one or more of $Ni_{x3}Co_{y3}Mn_{z3}CO_3$ and $Ni_{x4}Co_{y4}Al_{z4}CO_3$. Correspondingly, a positive electrode active material formed therefrom may include one or more of $Li_{s3}Ni_{x3}Co_{y3}Mn_{z3}O_2$ and $Li_{s4}Ni_{x4}Co_{y4}Al_{z4}O_2$. x3+y3+z3=3, to be specific, 0≤x3≤1, 0≤y3≤1, 0≤z3≤1, and x3+y3+z3=1. Optionally, 0<x3<1, 0<y3<1, and 0<z3<1. Further optionally, 0.3≤x3≤0.95, 0.5≤x3≤0.9, or 0.6≤x3≤0.8. 0.7≤s3≤1.2. Optionally, 0.8≤s3≤1.2, 0.9≤s3≤1.15, 1.0≤s3≤1.2, or 1.0≤s3≤1.1. x4+y4+z4=1, to be specific, 0≤x4≤1, 0≤y4≤1, 0≤z4≤1, and x4+y4+z4=1. Optionally, 0<x4<1, 0<y4<1, and 0<z4<1. Further optionally, 0.3≤x4≤0.95, 0.5≤x4≤0.9, or 0.6≤x4≤0.85. 0.7≤s4≤1.2. Optionally, 0.8≤s4≤1.2, 0.9≤s4≤1.15, 1.0≤s4≤1.2, or 1.0≤s4≤1.1.

In an example, the transition metal carbonate may be selected from one or more of nickel carbonate $NiCO_3$, cobalt carbonate $CoCO_3$, manganese carbonate $MnCO_3$, nickel cobalt composite carbonate $Ni_{x3}Co_{y3}CO_3$ (0<x3<1, 0<y3<1, and x3+y3=1), nickel cobalt manganese composite carbonate $Ni_{x3}Co_{y3}Mn_{z3}CO_3$ (0<x3<1, 0<y3<1, 0<z3<1, and x3+y3+z3=1), and nickel cobalt aluminum composite carbonate $Ni_{x4}Co_{y4}Al_{z4}CO_3$ (0<x4<1, 0<y4<1, 0<z4<1, and x4+y4+z4=1). Optionally, the transition metal carbonate is selected from one or more of nickel cobalt manganese composite carbonate $Ni_{x3}Co_{y3}Mn_{z3}CO_3$ and nickel cobalt aluminum composite carbonate $Ni_{x4}Co_{y4}Al_{z4}CO_3$.

In some embodiments, the positive electrode active material precursor may be selected from transition metal oxides. The transition metal oxide may include, for example, one or more of $Ni_{x5}Co_{y5}Mn_{z5}O$ and $Ni_{x6}Co_{y6}Al_{z6}O$. Correspondingly, a positive electrode active material formed therefrom may include one or more of $Li_{s5}Ni_{x5}Co_{y5}Mn_{z5}O_2$ and $Li_{s6}Ni_{x6}Co_{y6}Al_{z6}O_2$. x5+y5+z5=1, to be specific, 0≤x5≤1, 0≤y5≤1, and x5+y5+z5=1. Optionally, 0<x5<1, 0<y5<1, and 0<z5<1. Further optionally, 0.5≤x5≤0.95, 0.5≤x5≤0.9, or 0.6≤x5≤0.8. 0.7≤s5≤1.2. Optionally, 0.8≤s5≤1.2, 0.9≤s5≤1.15, 1.0≤s5≤1.2, or 1.0≤s5≤1.1. x6+y6+z6=1, to be specific, 0≤x6≤1, 0≤y6≤1, 0≤z6<1, and x6+y6+z6=1. Optionally, 0<x6<1, 0<y6<1, and 0<z6<1. Further optionally, 0.3≤x6≤0.95, 0.5≤x6≤0.9, or 0.6≤x6≤0.85. 0.7≤s6≤1.2. Optionally, 0.8≤s6≤1.2, 0.9≤s6≤1.15, 1.0≤s6≤1.2, or 1.0≤s6≤1.1.

In an example, the transition metal oxide may be selected from one or more of nickel oxide NiO, cobalt oxide CoO, manganese oxide MnO, nickel cobalt composite oxide $Ni_{x5}Co_{y5}O$ (0<x5<1, 0<y5<1, and x5+y5=1), nickel cobalt manganese composite oxide $Ni_{x5}Co_{y5}Mn_{z5}O$ (0<x5<1, 0<y5<1, 0<z5<1, and x5+y5+z5=1), and nickel cobalt aluminum composite oxide $Ni_{x6}Co_{y6}Al_{z6}O$ (0<x6<1, 0<y6<1, 0<z6<1, and x6+y6+z6=1). Optionally, the transition metal oxide is selected from one or more of nickel cobalt manganese composite oxide $Ni_{x5}Co_{y5}Mn_{z5}O$ and nickel cobalt aluminum composite oxide $Ni_{x6}Co_{y6}Al_{z6}O$.

In some embodiments, the positive electrode active material precursor may be selected from transition metal phosphates. The transition metal phosphate may include, for example, $MPO_4$, where M is selected from one or more of Fe, Ni, Co, and Mn. Correspondingly, a positive electrode active material formed therefrom may include $Li_{s7}MPO_4$. 0.7≤s7≤1.2. Optionally, 0.8≤s7≤1.2, 0.9≤s7≤1.15, 1.0≤s7≤1.2, or 1.0≤s7≤1.1. A positive electrode active material generated through reaction between a proper transition metal phosphate and the free lithium compound requires a low sintering temperature, which may shorten a sintering duration, especially may reduce volatilization of the free lithium compound during sintering, and help improve purity of the positive electrode active material layer. In some embodiments, the transition metal phosphate may be selected from one or more of $FePO_4$ and $Fe_uM'_{1-u}PO_4$. 0<u<1, optionally, 0.1≤u≤0.9 or 0.2≤u≤0.8. M' may be selected from one or more of Mn, Ni, Co, Cr, Ti, V, and Ce, further from one or more of Ni, Co, and Mn.

In some embodiments, the positive electrode active material precursor is selected from one or more of transition metal oxides, transition metal hydroxides, and transition metal carbonates, $CoPO_4$, $NiPO_4$, $MnPO_4$, $FePO_4$, and $Fe_uM'_{1-u}PO_4$, and the lithium-rich metal oxide is selected from one or more of $Li_2NiO_2$, $Li_2CuO_2$, $Li_2Ni_aCu_bM_{1-a-b}O_2$, $Li_3VO_4$, $Li_3NbO_4$, $Li_5FeO_4$, and $Li_6CoO_4$. In these cases, u, M', a, b, and M each have a meaning defined herein. The composite positive electrode material obtained by using an appropriate positive electrode active material precursor and kernel material helps the battery obtain a high initial charge and discharge capacity and a long cycle life. A specific example of $Fe_uM'_{1-u}PO_4$ includes $Fe_uMn_{1-u}PO_4$.

Optionally, the lithium-rich metal oxide is selected from one or more of $Li_2NiO_2$, $Li_2CuO_2$, $Li_2Ni_aCu_bM_{1-a-b}O_2$, $Li_5FeO_4$, and $Li_6CoO_4$. Further optionally, the lithium-rich metal oxide is selected from one or more of $Li_5FeO_4$ and $Li_6CoO_4$. Further optionally, the lithium-rich metal oxide is selected from one or more of $Li_5FeO_4$ and $Li_6CoO_4$.

Optionally, the positive electrode active material precursor is selected from one or more of transition metal oxides, transition metal hydroxides, and transition metal carbonates. The transition metal oxides, transition metal hydroxides, and transition metal carbonates each may be the ones described herein. In some embodiments, the positive electrode active material precursor is selected from one or more of nickel cobalt manganese composite hydroxide $Ni_{x1}Co_{y1}Mn_{z1}(OH)_2$ and nickel cobalt aluminum composite hydroxide $Ni_{x2}Co_{y2}Al_{z2}(OH)_2$. In these cases, x1, y1, z1, x2, y2, and z2 each have a meaning defined herein. In these embodiments, optionally, a median particle size by volume $D_v50$ of the positive electrode active material precursor is 0.5 μm-1.2 μm, and further optionally 0.5 μm-1 μm, or 0.6 μm-1 μm. The $D_v50$ of the positive electrode active material precursor is in a proper range, which can further increase the initial charge and discharge capacity and cycle life of the battery.

Optionally, the positive electrode active material precursor is selected from one or more of transition metal phosphates. The transition metal phosphates may be the ones described herein. In some embodiments, the positive electrode active material precursor is selected from one or more of $CoPO_4$, $NiPO_4$, $MnPO_4$, $FePO_4$, and $Fe_uM'_{1-u}PO_4$. In these cases, u and M' each have a meaning defined herein. In these embodiments, optionally, $D_v50$ of the positive electrode active material precursor is 0.1 μm-1 μm, and further optionally 0.2 μm-0.8 μm, 0.3 μm-0.7 μm, or 0.4 μm-0.6 μm. The $D_v50$ of the positive electrode active material precursor is in a proper range, which can further increase the initial charge and discharge capacity and cycle life of the battery.

In some embodiments, a mass ratio of the kernel material to the positive electrode active material precursor is 30:1-2:1, and optionally 30:1-5:1, 25:1-10:1, 25:1-15:1, 20:1-5:1, 20:1-10:1, or 20:1-15:1. The mass ratio of the kernel material to the positive electrode active material precursor is in a proper range. This achieves a better coating and protection function for the kernel lithiation material by the positive electrode active material layer and also improves positive electrode active material purity for the positive electrode active material layer. Therefore, the composite positive electrode active material can have high stability and reversible capacity, thereby increasing the initial charge and discharge capacity and cycle life of the battery that uses the composite positive electrode active material.

In step (3), any means known in the art may be used to attach the positive electrode active material precursor to at least a partial surface of the kernel material. In an example, a mechanical fusion machine may be used for mechanical fusion attaching. The mechanical fusion method can quickly and effectively mix the positive electrode active material precursor and the kernel material so that the positive electrode active material precursor is attached uniformly to the surface of the kernel material. The positive electrode active material precursor and the kernel material may form uniform and tight attaching through chemical bonding and/or physical bonding (for example, intermolecular force).

Optionally, during mechanical fusion, high-speed fusion may be performed for 1 hour-10 hours at a rotation speed of 200 rpm (rpm)-1,000 rpm to attach the positive electrode active material precursor to the surface of the kernel material. Optionally, the rotation speed is 300 rpm-800 rpm. Optionally, fusion is performed for 2 hours-6 hours. Fusion may be performed at a room temperature, for example, 20° C.-30° C., for example, 25° C.

In step (4), any means known in the art may be used to make the positive electrode active material precursor react with the free lithium compound in the kernel material to form a positive electrode active material and obtain a composite positive electrode material. In some embodiments, heat treatment may be performed at 600° C.-1000° C. in a protective gas atmosphere for 2 hours-12 hours to make the positive electrode active material precursor react with the free lithium compound to form the positive electrode active material. In some embodiments, the temperature for heat treatment is optionally 600° C.-800° C., 600° C.-700° C., or 650° C.-750° C. Optionally, heat treatment is performed for 2 hours-10 hours, 2 hours to 8 hours, 4 hours-8 hours, or 4 hours-6 hours. An appropriate sintering condition helps implement uniform and effective coating for the lithiation material in the kernel by the positive electrode active material and may improve crystallinity of the positive electrode active material, further increasing a reversible capacity and cycle stability of the composite positive electrode material. The protective gas may be selected from one or more of nitrogen, argon, and hydrogen/argon mixed gas.

In the following, this application provides a composite positive electrode material. The composite positive electrode material contains a lithium-rich metal oxide and a positive electrode active material covering at least a partial surface of the lithium-rich metal oxide. The positive electrode active material is formed through in-situ reaction between a positive electrode active material precursor and a free lithium compound on the surface of the lithium-rich metal oxide.

In the composite positive electrode material in this application, lithium ions released from the lithium-rich metal oxide in the kernel in a first charge process may make up for the consumption of active lithium due to formation of an SEI film on a negative electrode. This increases an initial charge and discharge capacity, initial coulombic efficiency, and a cycle life of a battery. The positive electrode active material of a housing coats the surface of the lithium-rich metal oxide to isolate the external environment, which increases stability of the lithium-rich metal oxide during storage and use, and ensures purity and lithiation performance of the lithium-rich metal oxide. In addition, the positive electrode active material coating layer is a good lithium-ion conductor, can provide a good lithium-ion diffusion channel in a charge and discharge process of the battery and help improve lithiation efficiency. The composite positive electrode material increases capacity utilization of the lithium-rich metal oxide and makes the lithium-rich metal oxide release more active lithium. Excessive active lithium is intercalated into a negative electrode, making a negative electrode active material in a lithium-intercalated state. This alleviates a volume change of the negative electrode active material to some extent, reduces a risk of breakage or peeling of the negative electrode active material in the negative electrode, and may further maintain good affinity and liquid retention of an electrolyte. In addition, the active lithium may be further used to make up for active lithium loss during battery cycling in the middle to late cycle. Therefore, a battery using the composite positive electrode material in this application may have a further prolonged cycle life.

Using the positive electrode active material to coat the lithium-rich metal oxide may avoid additionally introducing inactive substance, thereby helping the battery obtain a high energy density.

Especially, the positive electrode active material precursor reacts in-situ on the surface of the lithium-rich metal oxide to from a more dense and uniform positive electrode active material coating layer. In addition, the positive electrode active material coating layer generated in-situ is more tightly attached to the lithium-rich metal oxide. Therefore, stability of the composite positive electrode material is further increased and lithium-ion migration performance is further improved, which helps the battery obtain a high initial charge and discharge capacity and a long cycle life. Tight attaching between the positive electrode active material coating layer and the lithium-rich metal oxide may further reduce a risk of peeling of the coating layer, thereby protecting the lithium-rich metal oxide during storage and use and better increasing the cycle life of the battery.

Especially, the in-situ generation of the positive electrode active material by the positive electrode active material precursor consumes the free lithium compound on the surface of the lithium-rich metal oxide, which reduces a pH value, thus avoids slurry gelation caused by strong alkalinity of the lithium-rich metal oxide, and improves processing performance of a positive electrode slurry and a positive electrode membrane layer.

Figure 1:
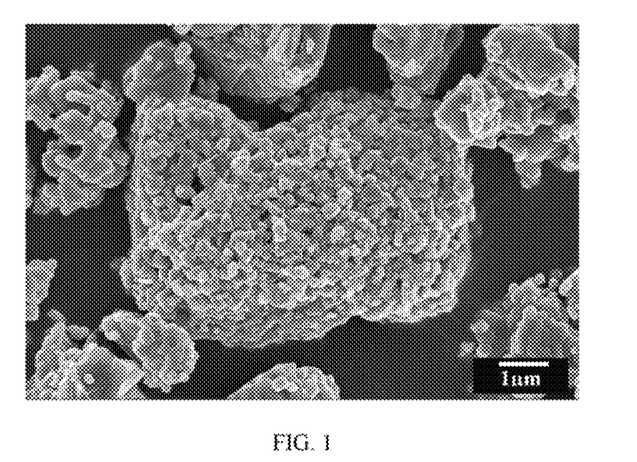
FIG. 1 is a scanning electron microscope (SEM) diagram of a composite positive electrode material according to an embodiment of this application.
Figure 2A:
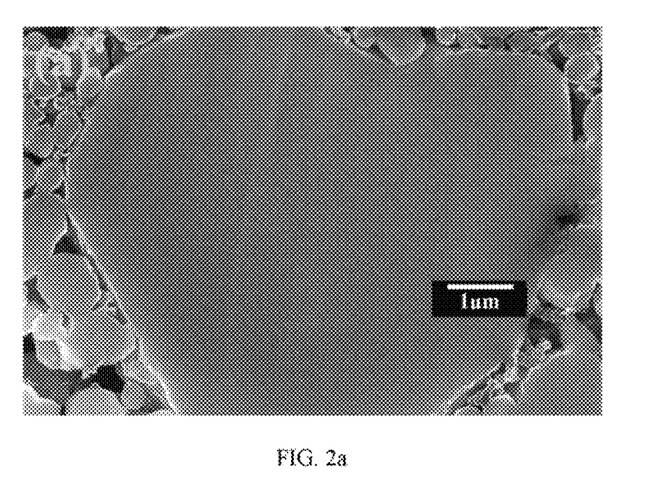
FIG. 2a is an SEM diagram of a section of a composite positive electrode material according to Example 3.
Figure 2B:
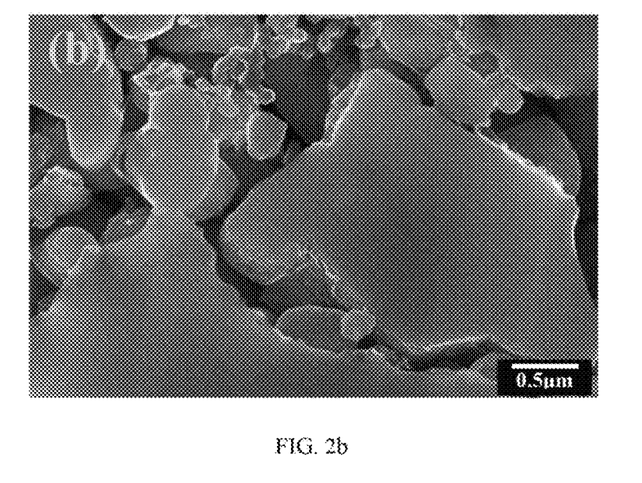
FIG. 2b is an SEM diagram of a section of a composite positive electrode material according to Comparative Example 1.

In some embodiments, the positive electrode active material in the composite positive electrode material is distributed on the surface of the lithium-rich metal oxide in a form of independent particle. A scanning electron microscope (for example, SIGMA300) may be used to observe a profile of the composite positive electrode material. FIG. 1 is an SEM diagram of a composite positive electrode material used as an example. FIG. 2 is an SEM diagram of a section of a composite positive electrode material used as an example. The section of the composite positive electrode material may be obtained by using an ion polisher (for example, an argon ion cross section polisher, such as IB-19500CP). It can be seen from the diagram that the composite positive electrode material is composed of kernel particles, with its surface coated with a large amount of positive electrode active material particles.

In this application, the positive electrode active material is distributed on the surface of the lithium-rich metal oxide in a form of independent particle. The positive electrode active material on the surface of the composite positive electrode material may form effective physical blocking to prevent direct contact between the lithium-rich metal oxide and an electrolyte, reduce side reactions, and further increase electrochemical stability of the lithium-rich metal oxide. The positive electrode active material in a form of particle may better perform its high-capacity feature. Therefore, a battery using the composite positive electrode material can obtain high energy density and cycle performance.

In some embodiments, a coating percentage of the positive electrode active material on the surface of the lithium-rich metal oxide is ≥60%, further optionally, ≥70%, ≥80%, ≥90%, ≥95%, or ≥100%. In this application, the coating percentage of the positive electrode active material on the surface of the lithium-rich metal oxide is in a broad range. This may further reduce sensitivity of the composite positive electrode material to an external environment (especially humidity), effectively avoid slurry gelation of the composite positive electrode material during preparation of a positive electrode slurry, and improve processing performance of the composite positive electrode material during use of the battery.

Optionally, the lithium-rich metal oxide in the kernel and the positive electrode active material in the housing may be attached through chemical bonding and physical bonding (for example, intermolecular force). In some embodiments, in the composite positive electrode material, the positive electrode active material particle is tightly attached to the surface of the lithium-rich metal oxide through chemical bonding between the lithium-rich metal oxide and the positive electrode active material. As a result, the composite positive electrode material has high microscopic structural stability and electrochemical stability. Therefore, a battery using the composite positive electrode material can obtain good long-term cycle performance.

It may be understood that the composite positive electrode material may be prepared in the preparation method of a composite positive electrode material described in this application, with corresponding beneficial effects obtained.

This application further provides a secondary battery, including a positive electrode plate. The positive electrode plate includes any one or more of the composite positive electrode material in this application. The secondary battery in this application has a high initial charge and discharge capacity, high energy density, and a long cycle life.

The secondary battery further includes a negative electrode plate and an electrolyte. In the charge and discharge process of the secondary battery, active ions are intercalated and deintercalated between the positive electrode plate and the negative electrode plate. The electrolyte conducts ions between the positive electrode plate and the negative electrode plate.

[Positive Electrode Plate]

This application provides a positive electrode plate, including a positive electrode current collector and a positive electrode membrane layer disposed on the positive electrode current collector. In an example, the positive electrode current collector includes two opposite surfaces in its thickness direction, and the positive electrode membrane layer is laminated on either or both of the two opposite surfaces of the positive electrode current collector.

The positive electrode membrane layer includes at least a first positive electrode material, and the first positive electrode material contains any one or more of the composite positive electrode material according to this application. In some embodiments, the first positive electrode material is any one or more of the composite positive electrode material in this application.

In some embodiments, the positive electrode membrane layer further includes a second positive electrode material. The second positive electrode material may be an active material known in the art that can be used as a positive electrode of a secondary battery. In an example, the second positive electrode material may include one or more of a lithium transition metal oxide and a polyanion positive electrode material. Optionally, the lithium transition metal oxide is selected from one or more of lithium cobalt oxides (for example, $LiCoO_2$), lithium nickel oxides (for example, $LiNiO_2$), layered lithium manganese oxides (for example, $LiMnO_2$), lithium nickel cobalt manganese oxides (for example, $LiNi_{\alpha1}Co_{\beta1}Mn_{1-\alpha1-\beta1}O_2$, where $0<\alpha1<1$ and $0<\beta1<1$), lithium nickel cobalt aluminum oxides (for example, $LiNi_{\alpha2}Co_{\beta2}Al_{1-\alpha2-\beta2}O_2$, where $0<\alpha2<1$ and $0<\beta2<1$), a spinel lithium manganese oxide (for example, $LiMn_2O_4$), a spinel lithium nickel manganese oxide (for example, $LiNi_{0.5}Mn_{1.5}O_4$), and a modified material thereof. Optionally, the polyanion positive electrode material is selected from one or more of lithium iron phosphates (for example, $LiFePO_4$), lithium manganese phosphates (for example, $LiMnPO_4$), lithium cobalt phosphates (for example, $LiCoPO_4$), lithium nickel phosphates (for example, $LiNiPO_4$), lithium manganese iron phosphates (for example, $LiFe_\gamma Mn_{1-65} PO_4$, where $0<\gamma<1$), and a modified material thereof. The positive electrode membrane layer further includes a second positive electrode material. This can increase a percentage of the positive electrode active material in the positive electrode plate and help the battery obtain a high energy density. The modified material may be obtained by means of coating and/or doping.

In some embodiments, based on a total mass of the first positive electrode material and the second positive electrode material, a mass percentage of the first positive electrode material in the positive electrode membrane layer is optionally 5%-100% and further optionally 5%-50%, 10%-40%, 15%-35%, 10%-25%, or 20%-30%. The positive electrode membrane layer includes a proper amount of first positive electrode material so that the battery has a high energy density and a long cycle life.

Typically, the positive electrode membrane layer further optionally includes a binder and optionally includes a conductive agent. Typically, the first positive electrode material, optionally the second positive electrode material, optionally the conductive agent, and optionally the binder is dissolved in a solvent and stirred uniformly to form a positive electrode slurry, followed by drying and cold pressing to form the positive electrode membrane layer. The solvent may be N-methylpyrrolidone (NMP).

The binder is capable of firmly binding the positive electrode material and optionally the conductive agent to the positive electrode current collector. In some embodiments, the binder of the positive electrode membrane layer may be selected from one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and a modified polymer thereof.

The conductive agent is capable of improving electronic conduction performance of the positive electrode membrane layer. In some embodiments, the conductive agent of the positive electrode membrane layer may be selected from one or more of superconducting carbon, carbon black (for example, Super P, acetylene black, or Ketjen black), carbon dots, carbon nanotubes, grapheme, and carbon nanofibers.

A material with good conductivity and mechanical strength may be used as the positive electrode current collector. In an example, an aluminum foil may be used as the positive electrode current collector.

[Negative Electrode Plate]

A negative electrode plate in this application includes a negative electrode current collector and a negative electrode membrane layer disposed on at least one surface of the negative electrode current collector. In an example, the negative electrode current collector includes two opposite surfaces in its thickness direction, and the negative electrode membrane layer is laminated on either or both of the two opposite surfaces of the negative electrode current collector.

In the negative electrode plate in this application, the negative electrode membrane layer typically includes a negative electrode material, optionally includes a binder, and optionally includes a conductive agent and another optional promoter. Typically, it is formed by coating a negative electrode slurry on the negative electrode current collector, followed by drying and cold pressing. Typically, the negative electrode slurry is formed by dissolving the negative electrode material, optionally the conductive agent, optionally the binder, and the optional promoter in a solvent, and uniformly stirring the mixture. The solvent may be N-methylpyrrolidone (NMP) or deionized water.

In some embodiments, the negative electrode material may be selected from one or more of artificial graphite, natural graphite, silicon-based materials, and tin-based materials. Optionally, the negative electrode active material contains one or more of artificial graphite and natural graphite. Further optionally, the negative electrode active material contains artificial graphite.

In some embodiments, the conductive agent may include one or more of superconducting carbon, carbon black (for example, Super P, acetylene black, or Ketjen black), carbon dots, carbon nanotubes, grapheme, and carbon nanofibers.

In some embodiments, the binder may include one or more of styrene butadiene rubber (SBR), water-based acrylic resin, polyvinyl alcohol (PVA), sodium alginate (SA), and carboxymethyl chitosan (CMCS).

In some embodiments, the another optional promoter is, for example, a thickener (for example, sodium carboxymethyl cellulose CMC-Na) or a PTC thermistor material.

A material with good conductivity and mechanical strength may be used as the negative electrode current collector to conduct electricity and collect current. In some embodiments, a copper foil may be used as the negative electrode current collector.

[Electrolyte]

The electrolyte conducts ions between the positive electrode plate and the negative electrode plate. A type of the electrolyte in this application is not particularly limited, and may be selected as appropriate to actual needs. For example, the electrolyte may be selected from a liquid electrolyte. The liquid electrolyte includes an electrolytic salt and a solvent.

In some embodiments, the electrolytic salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis-trifluoromethanesulfonimidetrifluoromethanesulfon imide (LiTFSI), lithium trifluoromethanesulfonat (LiTFS), lithium di fluorooxalatoborate (LiDFOB), lithium bisoxalatoborate (LiBOB), lithium difluorophosphate ($LiPO_2F_2$), lithium difluorophosphate (LiDFOP), and lithium tetrafluoro oxalate phosphate (LiTFOP).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), gamma butyrolactone (GBL), sulfolane (SF), dimethyl sulfone (MSM), methyl ethyl sulfone (EMS), and diethyl sulfone (ESE).

In some embodiments, the electrolyte further optionally includes an additive. For example, the additive may include a negative electrode film-forming additive, may include a positive electrode film-forming additive, and may further include an additive that can improve certain performance of the battery, for example, an additive that improves overcharge performance of the battery, an additive that improves high-temperature performance of the battery, and an additive that improves low-temperature performance of the battery.

[Separator]

A separator is disposed between the positive electrode plate and the negative electrode plate for isolation. A type of the separator in the secondary battery in this application is not particularly limited. Any common porous separators used for secondary batteries may be selected. For example, the separator may be selected from one or more of a glass fiber membrane, a non-woven fabric membrane, a polyethylene membrane, a polypropylene membrane, a polyvinylidene fluoride membrane, and a multi-layer membrane consisting of one or more than two of these membranes.

The positive electrode plate, negative electrode plate, and separator may be made into an electrode assembly through lamination or winding so that the separator is disposed between the positive electrode plate and the negative electrode plate for isolation. The secondary battery may be obtained by placing the electrode assembly in an outer package, and injecting the electrolyte, followed by sealing.

The outer package of the secondary battery is used to encapsulate the electrode assembly and the electrolyte. In some embodiments, the outer package of the secondary battery may be a hard shell, for example, a hard plastic shell, an aluminum shell, or a steel shell. The outer package of the secondary battery may also be a soft package, for example, a soft bag. A material of the soft package may be plastic, for example, may include one or more of polypropylene (PP), polybutylene terephthalate (PBT), polybutylene succinate (PBS), and the like.

Figure 3:
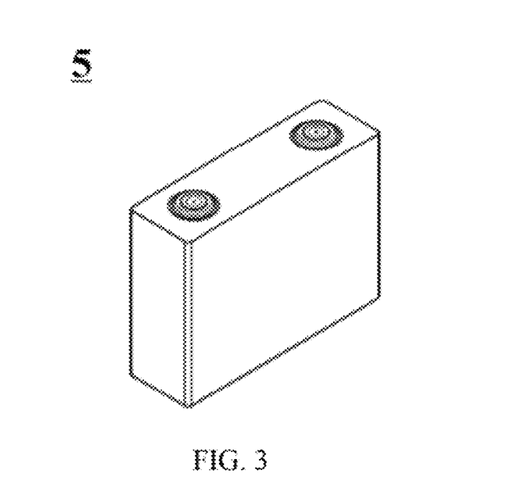
FIG. 3 is a schematic diagram of an embodiment of a secondary battery.

A shape of the secondary battery is not specially limited in this application, and the secondary battery may be of a cylindrical battery, a pouch battery, or a battery in any other shapes. FIG. 3 is a secondary battery 5 of a square structure used as an example.

Figure 4:
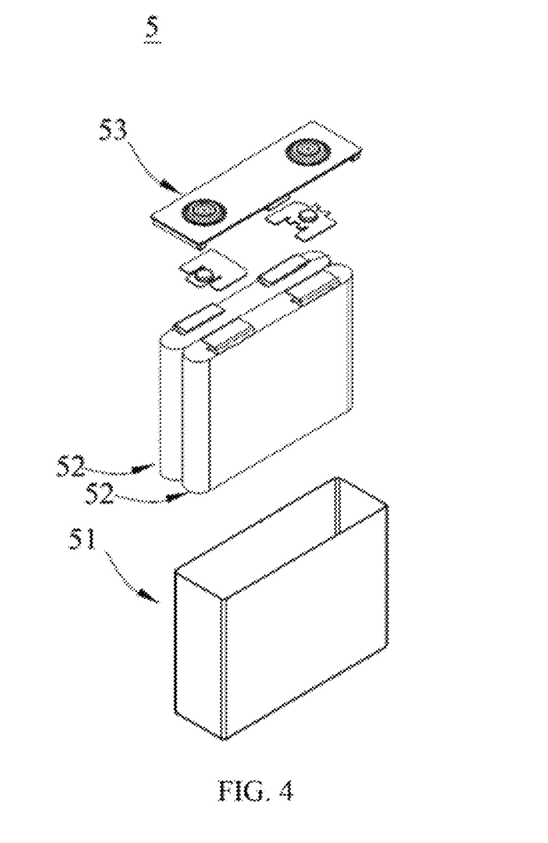
FIG. 4 is an exploded view of FIG. 3.

In some embodiments, referring to FIG. 4, the outer package may include a housing 51 and a cover plate 53. The housing 51 may include a bottom plate and a side plate connected to the bottom plate, and the bottom plate and the side plate are enclosed to form an accommodating cavity. The housing 51 has an opening communicating with the accommodating cavity, and the cover plate 53 can cover the opening, to seal the accommodating cavity. The electrode assembly 52 is packaged in the accommodating cavity. The electrolyte is infiltrated in the electrode assembly 52. There may be one or more electrode assemblies 52 in the secondary battery 5, and their quantity may be adjusted as required.

In some embodiments, the secondary battery may be assembled into a battery group. Examples of the battery group include a battery module, a battery pack, and the like. The battery module may be assembled from a plurality of secondary batteries. The battery module may include a plurality of secondary batteries. A specific quality may be adjusted based on use and capacity of the battery module. The battery pack may be assembled from a plurality of secondary batteries or battery modules. A quantity of secondary batteries or battery modules included in the battery pack may be adjusted based on use and capacity of the battery pack.

Figure 5:
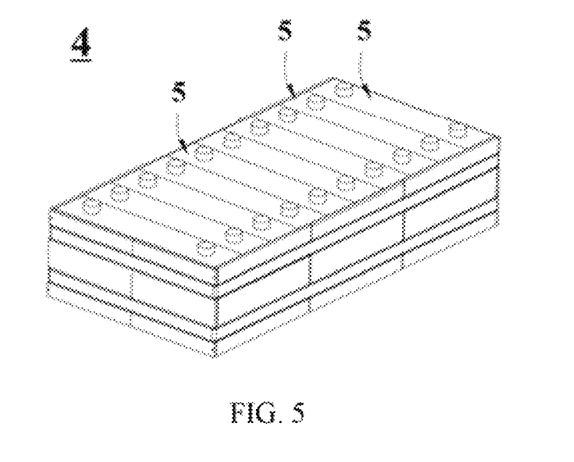
FIG. 5 is a schematic diagram of an embodiment of a battery module.

FIG. 5 shows a battery module 4 used as an example. Referring to FIG. 5, in the battery module 4, a plurality of secondary batteries 5 may be sequentially arranged along a length direction of the battery module 4. Certainly, the secondary batteries may be arranged in any other manner. Further, the plurality of secondary batteries 5 may be fastened by using fasteners. Optionally, the battery module 4 may further include a housing with an accommodating space to accommodate the plurality of secondary batteries 5.

Figure 6:
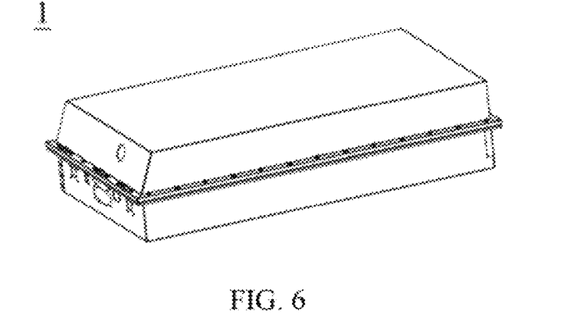
FIG. 6 is a schematic diagram of an embodiment of a battery pack.
Figure 7:
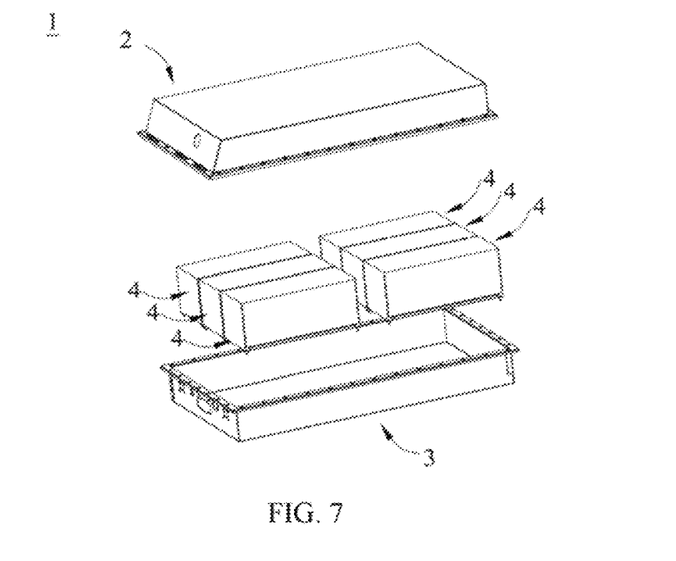
FIG. 7 is an exploded view of FIG. 6.

FIG. 6 and FIG. 7 show a battery pack 1 used as an example. Referring to FIG. 6 and FIG. 7, the battery pack 1 may include a battery box and a plurality of battery modules 4 arranged in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

This application further provides an electric apparatus. The electric apparatus includes at least one of the secondary battery, the battery module, or the battery pack according to this application. The secondary battery, the battery module, or the battery pack may be used as a power source for the electric apparatus, or an energy storage unit of the electric apparatus. The electric apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the electric apparatus according to requirements for using the electric apparatus.

Figure 8:
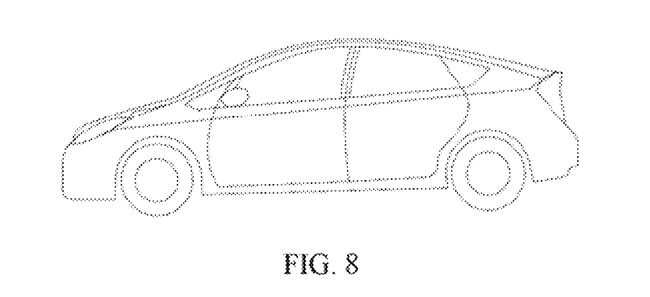
FIG. 8 is a schematic diagram of an embodiment of an apparatus using a secondary battery as a power source.

FIG. 8 shows an electric apparatus used as an example. The apparatus is a battery electric vehicle, a hybrid electric vehicle, a plug-in hybrid electric vehicle, or the like. To meet a requirement of the apparatus for high power and a high energy density of a secondary battery, a battery pack or a battery module may be used.

In another example, the electric apparatus may be a mobile phone, a tablet computer, a notebook computer, or the like. Such apparatus is generally required to be light and thin, and may use a secondary battery as its power source.

EXAMPLES

Content disclosed in this application is described in detail in the following examples. These examples are intended only for illustrative purposes because various modifications and changes made without departing from the scope of the content disclosed in this application are apparent to those skilled in the art. Unless otherwise stated, all content, percentages, and ratios reported in the following examples are based on weights, all reagents used in the examples are commercially available or synthesized in a conventional manner, and can be used directly without further processing, and all instruments used in the examples are commercially available.

Example 1

Preparation of Lithium-Ion Secondary Battery:

Preparation of Composite Positive Electrode Material

A kernel material was a lithium-rich metal oxide $Li_2Ni_{0.6}Cu_{0.4}O_2$ that included a free lithium compound (mainly $Li_2O$, $LiOH$, and $Li_2CO_3$). A mass percentage of the free lithium compound in the kernel material was 1 wt %. A $D_v50$ of the kernel material was 5 μm. A positive electrode active material precursor was $FePO_4$ (iron phosphate, FP for short), and its $D_v50$ was 0.5 μm. Mechanical fusion coating was performed by using a mechanical fusion machine: The kernel material and the positive electrode active material precursor FP were added into the mechanical fusion machine at a mass ratio of 20:1. High-speed fusion was performed at a speed of 400 rpm for 4 hours so that the FP was attached to a surface of the kernel material. Sintering was performed at 700° C. for 6 hours in a nitrogen atmosphere so that the FP reacted in-situ with the free lithium compound to form a positive electrode active material lithium iron phosphate $LiFePO_4$ (LFP for short) on a surface of the lithium-rich metal oxide, to obtain a composite positive electrode material.

Preparation of Positive Electrode Plate

The prepared composite positive electrode material, a conductive agent carbon black (Super P), and a binder PVDF were dispersed at a mass ratio of 97:2:1 in a solvent NMP, and were fully stirred and mixed uniformly to obtain a positive electrode slurry. The positive electrode slurry was applied on two relative surfaces of a positive electrode current collector aluminum foil, followed by drying and cold pressing, to obtain a positive electrode plate. An areal density of a positive electrode membrane layer was 18 mg/cm$^2$, and a compacted density was 2.45 g/cm$^3$.

Preparation of Negative Electrode Plate

A negative electrode active material artificial graphite, a conductive agent carbon black (Super P), a binder styrene-butadiene rubber (SBR), and a thickener sodium carboxymethyl cellulose (CMC-Na) were dispersed at a mass ratio of 96:1.5:1.5:1.0 in a solvent deionized water, and were stirred and mixed uniformly to obtain a negative electrode slurry. The negative electrode slurry was applied on two relative surfaces of a negative electrode current collector copper foil, followed by drying and cold pressing, to obtain a negative electrode plate. An areal density of a negative electrode membrane layer was 8.0 mg/cm$^2$, and a compacted density was 1.65 g/cm$^3$.

Preparation of Electrolyte

Ethylene carbonate (EC) and ethyl methyl carbonate (EMC) were mixed uniformly at a mass ratio of 30:70 to obtain an organic solvent; then a lithium salt $LiPF_6$ was dissolved in the organic solvent. The mixture was mixed uniformly to obtain an electrolyte. A concentration of $LiPF_6$ was 1 mol/L.

Preparation of Secondary Battery

The positive electrode plate, a separator porous polyethylene (PE), and the negative electrode plate were stacked in order and the resulting stack was wound to obtain a battery assembly; and the battery assembly was placed in an outer package, the electrolyte was injected, and then the outer package was sealed to obtain a secondary battery.

Examples 2 to 24

Secondary batteries were prepared in a method similar to that in Example 1, except that related parameters used to prepare a composite positive electrode material was adjusted. Details are shown in Table 1.

Comparative Example 1

Preparation of Composite Positive Electrode Material

A kernel material was the same as that in Example 3. A positive electrode active material was LiFePO$_4$ (lithium iron phosphate, LFP for short), and its D$_v$50 was 0.5 μm. Mechanical fusion coating was performed by using a mechanical fusion machine: The kernel material and the positive electrode active material LFP were added into the mechanical fusion machine at a mass ratio of 20:1. High-speed fusion was performed at a speed of 400 rpm for 4 hours so that the LFP was attached to a surface of the kernel material.

The remaining processes for preparing the secondary batteries were the same as that in Example 1.

FIG. 2a is an SEM diagram of a section of a composite positive electrode material according to Example 3. FIG. 2b is an SEM diagram of a section of a composite positive electrode material according to Comparative Example 1. In the diagrams, particles with a large kernel are the lithium-rich metal oxide Li$_2$Ni$_{0.6}$Cu$_{0.4}$O$_2$, and particles with a small shell are the positive electrode active material LFP. It can be seen from the diagrams that in the composite positive electrode material in Example 3 that is obtained in an in-situ coating method according to this application, an LFP coating layer on a surface of the Li$_2$Ni$_{0.6}$Cu$_{0.4}$O$_2$ particle is more uniform and dense, and attaching between the Li$_2$Ni$_{0.6}$Cu$_{0.4}$O$_2$ particle and the LFP coating layer is more tight.

Examples 25 to 29

Secondary batteries were prepared in a method similar to that in Example 1, except that Ni$_{0.8}$Co$_{0.1}$Mn$_{0.1}$(OH)$_2$ (NC-MOH for short) was used as a positive electrode active material precursor and the positive electrode active material precursor reacted with a free lithium compound in a kernel material to form a positive electrode active material LiNi$_{0.8}$Co$_{0.1}$Mn$_{0.1}$O$_2$ (LNCMO for short). An areal density of a positive electrode membrane layer was 19.5 mg/cm$^2$ and a compacted density was 3.4 g/cm$^3$. An areal density of a negative electrode membrane layer was 10.8 mg/cm$^2$ and a compacted density was 1.65 g/cm$^3$. Other differences are shown in Table 1.

Comparative Example 2

A secondary battery was prepared in a method similar to that in Comparative Example 1, except that LiNi$_{0.8}$Co$_{0.1}$Mn$_{0.1}$O$_2$(LNCMO) was used as a positive electrode active material, with its D$_v$50 being 0.8 μm. Other differences are shown in Table 1.

Performance Test for the Secondary Battery:

At 25° C., the secondary battery was constant-current charged to an upper limit of a cut-off voltage at a rate of 1C, and then constant-voltage charged to a current of 0.05C. A charge capacity at this moment was recorded as a charge capacity of the first cycle. Then the secondary battery was constant-current discharged to a lower limit of the cut-off voltage, and left standing for 5 minutes. This was one cycle charge and discharge process. A discharge capacity at this moment was recorded as a discharge capacity of the first cycle. A charge and discharge test was performed on the battery in the foregoing method. A discharge capacity of each cycle was recorded until a capacity retention rate of the battery decayed to 80%. The number of cycles was a cycle life.

An initial discharge capacity per gram (mAh/g) was obtained by dividing the discharge capacity of the first cycle by a mass of the composite positive electrode material in the battery.

In the test, when the positive electrode active material was LFP, a charge and discharge voltage of the secondary battery ranged from 2.5 V to 3.65 V. When the positive electrode active material was LNCMO, the charge and discharge voltage of the secondary battery ranged from 2.8 V to 4.25 V.

TABLE 1

| No. | Lithium-rich metal oxide | Coating raw material | Mass percentage | D$_v$50 of kernel material (μm) | D$_v$50 of coating raw material (μm) | Mass ratio | Initial discharge capacity per gram (mAh/g) | Cycle life (cycles) |
|---|---|---|---|---|---|---|---|---|
| Example 1 | Li$_2$Ni$_{0.6}$Cu$_{0.4}$O$_2$ | FP | 1 wt % | 5 | 0.5 | 20:1 | 146.1 | 5544 |
| Example 2 | Li$_2$Ni$_{0.6}$Cu$_{0.4}$O$_2$ | FP | 3 wt % | 5 | 0.5 | 20:1 | 149.0 | 5785 |
| Example 3 | Li$_2$Ni$_{0.6}$Cu$_{0.4}$O$_2$ | FP | 5 wt % | 5 | 0.5 | 20:1 | 151.6 | 6030 |
| Example 4 | Li$_2$Ni$_{0.6}$Cu$_{0.4}$O$_2$ | FP | 7 wt % | 5 | 0.5 | 20:1 | 148.7 | 5815 |
| Example 5 | Li$_2$Ni$_{0.6}$Cu$_{0.4}$O$_2$ | FP | 10 wt % | 5 | 0.5 | 20:1 | 145.5 | 5367 |
| Example 6 | Li$_2$Ni$_{0.6}$Cu$_{0.4}$O$_2$ | FP | 5 wt % | 2 | 0.5 | 20:1 | 146.8 | 5630 |
| Example 7 | Li$_2$Ni$_{0.6}$Cu$_{0.4}$O$_2$ | FP | 5 wt % | 3 | 0.5 | 20:1 | 149.5 | 5880 |
| Example 8 | Li$_2$Ni$_{0.6}$Cu$_{0.4}$O$_2$ | FP | 5 wt % | 6 | 0.5 | 20:1 | 150.2 | 5975 |
| Example 9 | Li$_2$Ni$_{0.6}$Cu$_{0.4}$O$_2$ | FP | 5 wt % | 8 | 0.5 | 20:1 | 145.9 | 5495 |
| Example 10 | Li$_2$Ni$_{0.6}$Cu$_{0.4}$O$_2$ | FP | 5 wt % | 5 | 0.05 | 20:1 | 146.4 | 5620 |
| Example 11 | Li$_2$Ni$_{0.6}$Cu$_{0.4}$O$_2$ | FP | 5 wt % | 5 | 0.1 | 20:1 | 147.7 | 5720 |
| Example 12 | Li$_2$Ni$_{0.6}$Cu$_{0.4}$O$_2$ | FP | 5 wt % | 5 | 1 | 20:1 | 148.9 | 5820 |
| Example 13 | Li$_2$Ni$_{0.6}$Cu$_{0.4}$O$_2$ | FP | 5 wt % | 5 | 2 | 20:1 | 145.6 | 5352 |
| Example 14 | Li$_2$Ni$_{0.6}$Cu$_{0.4}$O$_2$ | FP | 5 wt % | 5 | 0.5 | 5:1 | 145.3 | 5360 |
| Example 15 | Li$_2$Ni$_{0.6}$Cu$_{0.4}$O$_2$ | FP | 5 wt % | 5 | 0.5 | 10:1 | 146.5 | 5615 |
| Example 16 | Li$_2$Ni$_{0.6}$Cu$_{0.4}$O$_2$ | FP | 5 wt % | 5 | 0.5 | 25:1 | 144.6 | 5240 |
| Example 17 | Li$_2$Ni$_{0.6}$Cu$_{0.4}$O$_2$ | FP | 5 wt % | 5 | 0.5 | 30:1 | 145.9 | 5410 |
| Example 18 | Li$_2$Ni$_{0.6}$Cu$_{0.4}$O$_2$ | FP | 0.5 wt % | 5 | 0.5 | 5:1 | 143.7 | 5120 |
| Example 19 | Li$_2$Ni$_{0.6}$Cu$_{0.4}$O$_2$ | FP | 5 wt % | 1 | 3 | 20:1 | 144.1 | 5215 |
| Example 20 | Li$_2$Ni$_{0.6}$Cu$_{0.4}$O$_2$ | FP | 0.5 wt % | 10 | 0.5 | 20:1 | 142.2 | 5013 |
| Example 21 | Li$_6$CoO$_4$ | FP | 5 wt % | 5 | 0.5 | 18:1 | 153.8 | 6125 |
| Example 22 | Li$_2$CuO$_2$ | FP | 5 wt % | 5 | 0.5 | 20:1 | 151.3 | 6005 |

TABLE 1-continued

| No. | Lithium-rich metal oxide | Coating raw material | Mass percentage | $D_v50$ of kernel material (μm) | $D_v50$ of coating raw material (μm) | Mass ratio | Initial discharge capacity per gram (mAh/g) | Cycle life (cycles) |
|---|---|---|---|---|---|---|---|---|
| Example 23 | $Li_2NiO_2$ | FP | 5 wt % | 5 | 0.5 | 20:1 | 151.9 | 6065 |
| Example 24 | $Li_5FeO_4$ | FP | 5 wt % | 5 | 0.5 | 18:1 | 152.8 | 6080 |
| Comparative Example 1 | $Li_2Ni_{0.6}Cu_{0.4}O_2$ | LFP | 5 wt % | 5 | 0.5 | 20:1 | 141.2 | 4540 |
| Example 25 | $Li_2Ni_{0.6}Cu_{0.4}O_2$ | NCMOH | 5 wt % | 5 | 0.8 | 18:1 | 205.1 | 2870 |
| Example 26 | $Li_6CoO_4$ | NCMOH | 5 wt % | 5 | 0.8 | 16:1 | 207.6 | 2965 |
| Example 27 | $Li_2CuO_2$ | NCMOH | 5 wt % | 5 | 0.8 | 18:1 | 204.9 | 2750 |
| Example 28 | $Li_2NiO_2$ | NCMOH | 5 wt % | 5 | 0.8 | 18:1 | 204.7 | 2690 |
| Example 29 | $Li_5FeO_4$ | NCMOH | 5 wt % | 5 | 0.8 | 16:1 | 206.9 | 2930 |
| Comparative Example 2 | $Li_2Ni_{0.6}Cu_{0.4}O_2$ | LNCMO | 5 wt % | 5 | 0.8 | 18:1 | 198.5 | 2250 |

Note:
Unless otherwise specified, in Table 1, the mass percentage was a mass percentage of the free lithium compound in the kernel material, the mass ratio was a mass ratio of the kernel material to the coating raw material, and the coating raw material was a material used to coating the kernel material in the mechanical fusion coating step. In Examples 1 to 30, the coating raw materials were the positive electrode active material precursor. In Comparative Example 1, the coating raw material was the positive electrode active material LFP. In Comparative Example 2, the coating raw material was the positive electrode active material LNCMO.

In the examples of this application, the free lithium compound on the surface of the lithium-rich metal oxide was used as a lithium source to react in-situ with the positive electrode active material precursor to generate the positive electrode active material and thereby obtain the composite positive electrode material with the lithium-rich metal oxide coated in-situ with the positive electrode active material. It can be known from the results in Table 1 that compared with the composite positive electrode material obtained by directly coating the kernel material with the positive electrode active material in the comparative examples, the composite positive electrode materials in the examples of this application made the secondary battery obtain a high initial discharge capacity and a long cycle life.

It can be seen from the test results of Examples 1 to 5 that when a content of the free lithium compound in the kernel material was in a proper range, the initial discharge capacity and cycle life of the secondary battery could be further increased.

It can be seen from the test results of Example 3 and Examples 6 to 13 that when a particle size of the kernel material or the positive electrode active material precursor was in a proper range, the initial discharge capacity and cycle life of the secondary battery could be further increased.

It can be seen from the test results of Example 3 and Examples 14 to 17 that when a mass ratio of the kernel material to the positive electrode active material precursor was in a proper range, the initial discharge capacity and cycle life of the secondary battery could be further increased.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A preparation method of a composite positive electrode material, comprising the following steps:
    providing a kernel material, wherein the kernel material contains a lithium-rich metal oxide, and a surface of the lithium-rich metal oxide comprises a free lithium compound;
    providing a positive electrode active material precursor;
    attaching the positive electrode active material precursor to at least a partial surface of the kernel material; and
    making the positive electrode active material precursor react with the free lithium compound comprising: performing heat treatment at 600° C.-800° C. in a protective gas atmosphere for 2 hours to 8 hours; so that a positive electrode active material is formed on at least a partial surface of the lithium-rich metal oxide, to obtain the composite positive electrode material;
    wherein the free lithium compound comprises one or more of $Li_2O$, LiOH, and $Li_2CO_3$, and a mass percentage of the free lithium compound in the kernel material that is obtained through titration is 0.5 wt %-15 wt %;
    wherein the lithium-rich metal oxide is selected from one or more of $Li_2M^1O_2$, $Li_2M^2O_3$, $Li_3M^3O_4$, $Li_5M^4O_4$, and $Li_6M^5O_4$, wherein
    $M^1$ comprises one or more of Ni, Co, Fe, Mn, Zn, Mg, Ca, and Cu;
    $M^2$ comprises one or more of Mn, Sn, Mo, Ru, and Ir;
    $M^3$ comprises one or more of V, Nb, Cr, and Mo;
    $M^4$ comprises one or more of Fe, Cr, V, and Mo;
    $M^5$ comprises one or more of Co, V, Cr, and Mo; and
    a valence state of each metal element other than Li in the lithium-rich metal oxide is lower than a highest oxidation valence state of the metal element; and wherein the positive electrode active material precursor is selected from one or more of $Ni_{x1}Co_{y1}Mn_{z1}(OH)_2$, $Ni_{x2}Co_{y2}Al_{z2}(OH)_2$, $Ni_{x3}Co_{y3}Mn_{z3}CO_3$, $Ni_{x4}Co_{y4}AL_{z4}CO_3$, and $MPO_4$, wherein x1+y1+z1=1, x2+y2+z2=1, x3+y3+z3=1, x4+y4+z4=1, and M is selected from one or more of Fe, Ni, Co, and Mn.

2. The method according to claim 1, wherein a mass percentage of the free lithium compound in the kernel material that is obtained through titration is 1wt %- 10 wt %.

3. The method according to claim 1, wherein a mass ratio of the kernel material to the positive electrode active material precursor is 30:1-2:1.

4. The method according to claim 1, wherein a median particle size by volume $D_v50$ of the kernel material is 1 μm 10 μm.

5. The method according to claim 1, wherein a median particle size by volume $D_v50$ of the positive electrode active material precursor is 0.05 μm-3 μm.

6. The method according to claim 1, wherein a water content of the kernel material is ≤500 ppm.

7. The method according to claim 1, wherein the lithium-rich metal oxide is selected from one or more of $Li_2NiO_2$, $Li_2CuO_2$, $Li_2Ni_aCu_bM_{1-a-b}O_2$, $Li_2MnO_2$, $Li_3VO_4$, $Li_3NbO_4$, $Li_5FeO_4$, and $Li_6CoO_4$, wherein $0<a<1$, $0<b<1$, $0.9<a+b\leq1$, and M is selected from one or more of Zn, Sn, Mg, Fe, and Mn.

8. The method according to claim 1, wherein the positive electrode active material precursor is selected from one or more of transition metal oxides, transition metal hydroxides, and transition metal carbonates, and a median particle size by volume $D_v50$ of the positive electrode active material precursor is 0.5 μm-1.2 μm; or the positive electrode active material precursor is selected from one or more of transition metal phosphates, and a median particle size by volume $D_v50$ of the positive electrode active material precursor is 0.1 μm-1 μm.

9. A composite positive electrode material prepared in the method according to claim 1.

10. A secondary battery, comprising a positive electrode plate, wherein the positive electrode plate comprises a positive electrode current collector and a positive electrode membrane layer disposed on the positive electrode current collector, the positive electrode membrane layer comprises at least a first positive electrode material, and the first positive electrode material comprises the composite positive electrode material according to claim 9.

11. The secondary battery according to claim 10, wherein the positive electrode membrane layer further comprises a second positive electrode material, and the second positive electrode material comprises one or more of a lithium transition metal oxide and a polyanion positive electrode material;

wherein the lithium transition metal oxide is selected from one or more of lithium cobalt oxides, lithium nickel oxides, layered lithium manganese oxides, lithium nickel cobalt manganese oxides, lithium nickel cobalt aluminum oxides, spinel lithium manganese oxides, spinel lithium nickel manganese oxides, and modified materials thereof; and wherein, the polyanion positive electrode material is selected from one or more of lithium iron phosphates, lithium manganese phosphates, lithium cobalt phosphates, lithium nickel phosphates, lithium manganese iron phosphates, and modified materials thereof.

12. A battery group, comprising the secondary battery according to claim 10.

13. An electric apparatus, comprising the secondary battery according to claim 10.

14. An electric apparatus, comprising the battery group according to claim 12.

\* \* \* \* \*